US012057058B2

(12) United States Patent
Zheng et al.

(10) Patent No.: US 12,057,058 B2
(45) Date of Patent: Aug. 6, 2024

(54) PIXEL LUMINANCE FOR DIGITAL DISPLAY

(71) Applicant: Microsoft Technology Licensing, LLC, Redmond, WA (US)

(72) Inventors: Ying Zheng, Sammamish, WA (US); Matthew D. Morris, Seattle, WA (US); Vasudha Gupta, Fremont, CA (US); Younghun Paik, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/264,948

(22) PCT Filed: Feb. 10, 2022

(86) PCT No.: PCT/US2022/070603
§ 371 (c)(1),
(2) Date: Aug. 10, 2023

(87) PCT Pub. No.: WO2022/178494
PCT Pub. Date: Aug. 25, 2022

(65) Prior Publication Data

US 2024/0096268 A1 Mar. 21, 2024

(30) Foreign Application Priority Data

Feb. 18, 2021 (NL) ..................................... 2027588

(51) Int. Cl.
*G09G 3/32* (2016.01)

(52) U.S. Cl.
CPC ....... *G09G 3/32* (2013.01); *G09G 2320/0233* (2013.01); *G09G 2320/0247* (2013.01);
(Continued)

(58) Field of Classification Search
None
See application file for complete search history.

(56) References Cited

U.S. PATENT DOCUMENTS 5,583,530 A 12/1996 Mano et al.
7,183,723 B2 2/2007 Yu et al.
(Continued)

OTHER PUBLICATIONS

"PWM LEDs: Pulse Width Modulation for Dimming Systems and Other Applications", Retrieved From: https://resources.pcb.cadence.com/blog/2020-pwm-leds-pulse-width-modulation-for-dimming-systems-and-other-applications, Retrieved on Dec. 11, 2020, 7 Pages.
(Continued)

*Primary Examiner* — Christopher J Kohlman
(74) *Attorney, Agent, or Firm* — Alleman Hall & Tuttle LLP

(57) ABSTRACT

A digital display includes a plurality of pixel rows. For each pixel row, the digital display includes an EM gate driver configured to supply the pixel row with a luminance-controlling signal during each of a plurality of image frames. A luminance controller is configured to instruct the EM gate drivers to supply a pulse-width modulated signal to the plurality of pixel rows. Some pixel rows are supplied with a pulse-width modulated signal starting with an on pulse, and some pixel rows are supplied with a pulse-width modulated signal starting with an off pulse, on the same or different image frames.

20 Claims, 5 Drawing Sheets

(52) U.S. Cl.
CPC . *G09G 2320/064* (2013.01); *G09G 2330/021* (2013.01); *G09G 2340/0435* (2013.01)

(56) References Cited

U.S. PATENT DOCUMENTS

| | | | | |
|---|---|---|---|---|
| 8,258,714 | B2 | 9/2012 | Liu | |
| 9,578,702 | B2 | 2/2017 | Siessegger et al. | |
| 2006/0139289 | A1 | 6/2006 | Yoshida et al. | |
| 2007/0176883 | A1 | 8/2007 | Hsu et al. | |
| 2012/0262497 | A1 * | 10/2012 | Chang .................. | G09G 3/3674<br>345/94 |
| 2017/0018232 | A1 | 1/2017 | Nicholson | |
| 2017/0025064 | A1 | 1/2017 | Sarma et al. | |
| 2017/0124962 | A1 | 5/2017 | Oh et al. | |
| 2018/0075801 | A1 | 3/2018 | Le et al. | |
| 2018/0151109 | A1 | 5/2018 | Shim et al. | |
| 2018/0151132 | A1 | 5/2018 | Lee et al. | |
| 2020/0274322 | A1 | 8/2020 | Yamada | |

OTHER PUBLICATIONS

"Search Report Issued in Netherland Patent Application No. N2027588", Mailed Date: Nov. 30, 2021, 13 Pages.
"International Search Report and Written Opinion Issued in PCT Application No. PCT/US22/070603", Mailed Date: Apr. 26, 2022, 19 Pages.

* cited by examiner

PIXEL LUMINANCE FOR DIGITAL DISPLAY

CROSS REFERENCE TO RELATED APPLICATIONS

The present application is a U.S. National Phase of International Patent Application Serial No. PCT/US2022/070603 entitled "PIXEL LUMINANCE FOR DIGITAL DISPLAY", filed Feb. 10, 2022, which claims priority to Netherlands Patent Application Serial No. 2027588, filed Feb. 18, 2021, the entire contents of each of which are hereby incorporated by reference for all purposes.

BACKGROUND

Digital displays include a plurality of pixels that are individually controllable. The overall luminous intensity of the displayed image is dependent on the luminance of the individual pixels of the display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A digital display includes a plurality of pixel rows. For each pixel row, the digital display includes an EM gate driver configured to supply the pixel row with a luminance-controlling signal during each of a plurality of image frames. A luminance controller is configured to instruct the EM gate drivers to supply a pulse-width modulated signal to the plurality of pixel rows. Some pixel rows are supplied with a pulse-width modulated signal starting with an on pulse, and some pixel rows are supplied with a pulse-width modulated signal starting with an off pulse, on the same or different image frames.

Accordingly, there is provided a digital display as defined in each of the independent claims. Advantageous features are provided in accordance with the dependent claims.

DETAILED DESCRIPTION

Figure 1:
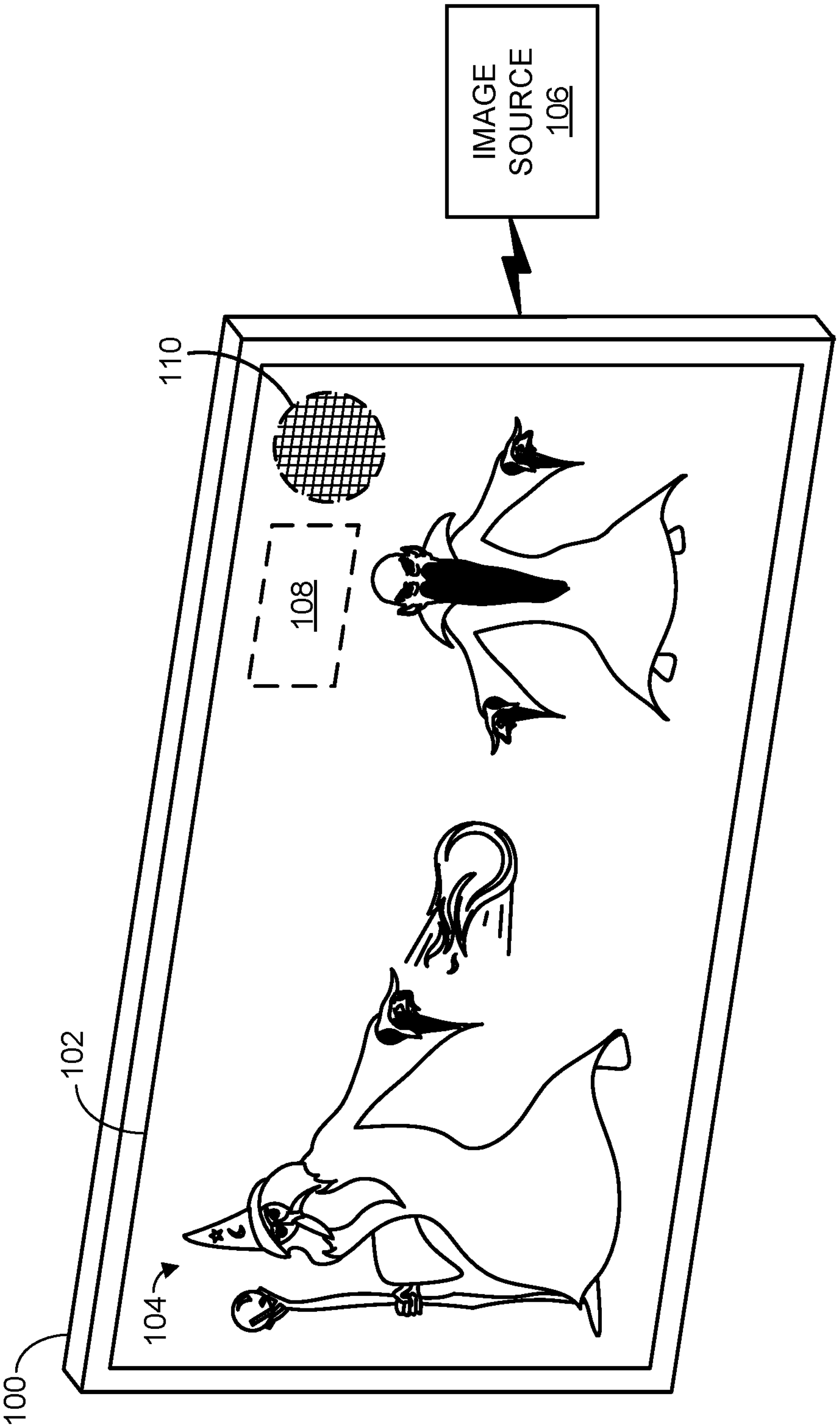
FIG. 1 schematically shows an example digital display system.

In controlling the luminance of digital displays, reducing the voltage supplied to the display's pixels may have the effect of reducing the luminance of the pixels, and thus the overall luminous intensity of the displayed image. By controlling the duty cycle of the pulse-width modulated signal, the luminance of the display may be advantageously controlled. Reduced luminance may be desirable when attempting to conserve power, or when ambient light levels are low, as examples; increased luminance may be desirable when ambient light levels are high, or when the device is plugged in and not relying on battery power. To some extent, luminance may be controlled by changing the pixel voltage amplitude. However, there is often a lower limit beyond which a reduction in pixel voltage will result in inconsistent or unstable performance. To address this, rather than decrease pixel voltage amplitude, a reduction in the luminous intensity of a displayed image can be achieved by driving pixels with a pulse-width modulated signal. This causes the pixels to rapidly cycle between on and off, reducing the overall amount of light emitted or transmitted by the pixels during a given interval of time (e.g., one image frame). The pulse-width modulated signal can be driven at a sufficiently high frequency so that the on/off cycling of the pixels is imperceptible to the human eye.

However, use of pulse-width modulated signals to control display luminance can present problems in some scenarios. In particular, the rate at which image frames are updated on a digital display is referred to as the display refresh rate. The frequency of the pulse-width modulated signal is typically set higher than the display refresh rate, such that multiple pixel on/off cycles occur during each image frame. Problems can arise when the pulse-width modulated signal is a non-integer multiple of the display refresh rate. For example, at some refresh rates, some image frames may end up having more pulse-width modulated on pulses than off pulses. This can cause an apparent increase in brightness of the displayed image, as compared to a different refresh rate where equal numbers of on and off pulses occur per frame. For other refresh rates, the opposite problem may occur—i.e., an apparent decrease in brightness when image frames include more off pulses than on pulses.

In particular, such situations can arise when the digital display uses a variable refresh rate. Depending on the type of content presented on the digital display, it can in some cases be desirable to vary the display's refresh rate. For example, a variable refresh rate may be used when the digital display is presenting visual content of a video game application that outputs image frames at different rates depending on the current complexity of the scene. As another example, some display devices may be configured to dynamically change their refresh rate to conserve power—e.g., the refresh rate may be reduced as the device's battery is depleted, or when the device enters a "power saver" mode. In any case, when pixels of the display device are driven with a pulse-width modulated signal and a variable refresh rate is used, the digital display may transition between different refresh rates that cause apparent increases or decreases in the brightness of the displayed image.

Accordingly, the present disclosure is directed to techniques for driving pixels of a digital display using pulse-width modulated signals in a manner that mitigates or alleviates the flickering issue described above. In one example, mitigation is accomplished via spatial averaging, in which half of the pixel rows of the digital display (e.g., odd rows) are supplied with pulse-width modulated signals having an opposite phase from the other half of the pixel rows (e.g., even rows). Thus, during image frames where the frequency of the pulse-width modulated signal is a non-integer multiple of the refresh rate, half of the pixel rows will have relatively higher luminous intensity, while the other half will have relatively less luminous intensity. Through spatial averaging, the display may appear to have a relatively uniform luminance to human viewers.

In another example, temporal averaging may be used in addition to, or as an alternative to, spatial averaging. In other words, for a first image frame, some or all pixel rows of the digital display may be supplied with the pulse-width modulated signal starting with an on pulse. Then, during a subsequent image frame, the same pixel rows may be supplied with the pulse-width modulated signal starting with an off pulse. Thus, while some frames may have relatively more luminous intensity than others, the rate at which frames are refreshed is sufficiently fast that a human user perceives the displayed images as being substantially homogenous in terms of luminance. Thus, using pulse-width modulated signals having opposite phases, and through one or both of spatial and temporal averaging, a display device may present image frames having reduced luminance while avoiding undesirable flickering effects.

FIG. 1 schematically shows an example digital display system 100, including a display 102. In FIG. 1, display system 100 is displaying visual content 104 based on input received from an image source 106. Specifically, a display controller 108 controls a plurality of pixels 110 of the digital display to form successive image frames depicting the visual content. For each image frame, the display controller controls each pixel to affect the color of light emitted or transmitted by the pixel and form the image frame specified by image source 106. The visual content presented by the digital display may be updated at any suitable fixed or variable refresh rate. As examples, refresh rates of 30 frames-per-second (FPS), 60 FPS, or 120 FPS may be used. The luminance of the pixels of the display may also be controlled to increase or decrease the total luminous intensity of the displayed image. Notably, the display luminance may be controlled independently from the color values of the individual pixels—in other words, even when a static image is displayed, the display luminance can be controlled to increase or decrease the total amount of light emitted or transmitted by the display's pixels.

The digital display system, image source, and display controller may each take any suitable form. As non-limiting examples, the digital display may take the form of a television, computer monitor, smartphone, tablet, laptop display, smart watch display, or mixed reality display. In some examples, the digital display may be a touch-sensitive display. While in FIG. 1, the digital display system only includes one display 102, a digital display system may in some cases include two or more displays—e.g., having a fixed spatial relationship or arranged in a moveable or foldable configuration. In such cases, the luminance control techniques described herein may be applied to any or all displays of the digital display system.

The digital display system may use any suitable display technology—as one example, the digital display may be an organic light-emitting diode (OLED) display. As another example, the digital display may be a micro light-emitting diode (micro-LED) display, or a quantum dot light-emitting diode (QLED) display. In some examples, non-LED based technologies may be used—e.g., the digital display may be a liquid crystal display (LCD). In any case, the digital display may have any suitable pixel resolution, and the pixels of the digital display may be configured to support any suitable range of color values.

The digital display may present image frames based on input from any suitable image source. Image source 106 may be integrated within, or external to, digital display system 100. In general, image source 106 may take the form of computer logic configured to render image frames for display. As non-limiting examples, this may include rendering visual content of an operating system installed on digital display system 100 or a separate computing system; rendering visual content of a software application, such as a video game, internet browser, word processor, etc.; or decoding data representing a still image file or sequence of video frames of a video file.

Similarly, the display controller 108 may take the form of any suitable computer processor, or other computer logic, configured to receive a plurality of image frames from image source 106, and control pixels 110 of the digital display to present the image frames for viewing. As discussed above, the display controller may be configured to update display of visual content by the digital display at a display refresh rate. In some cases, the display controller may be further configured to dynamically change the display refresh rate—e.g., based on the image content received from the image source, or based on the current power requirements of the digital display system.

In general, the digital display system, image controller, and display controller may each have any suitable capabilities, hardware configurations, and form factors.

Figure 2:
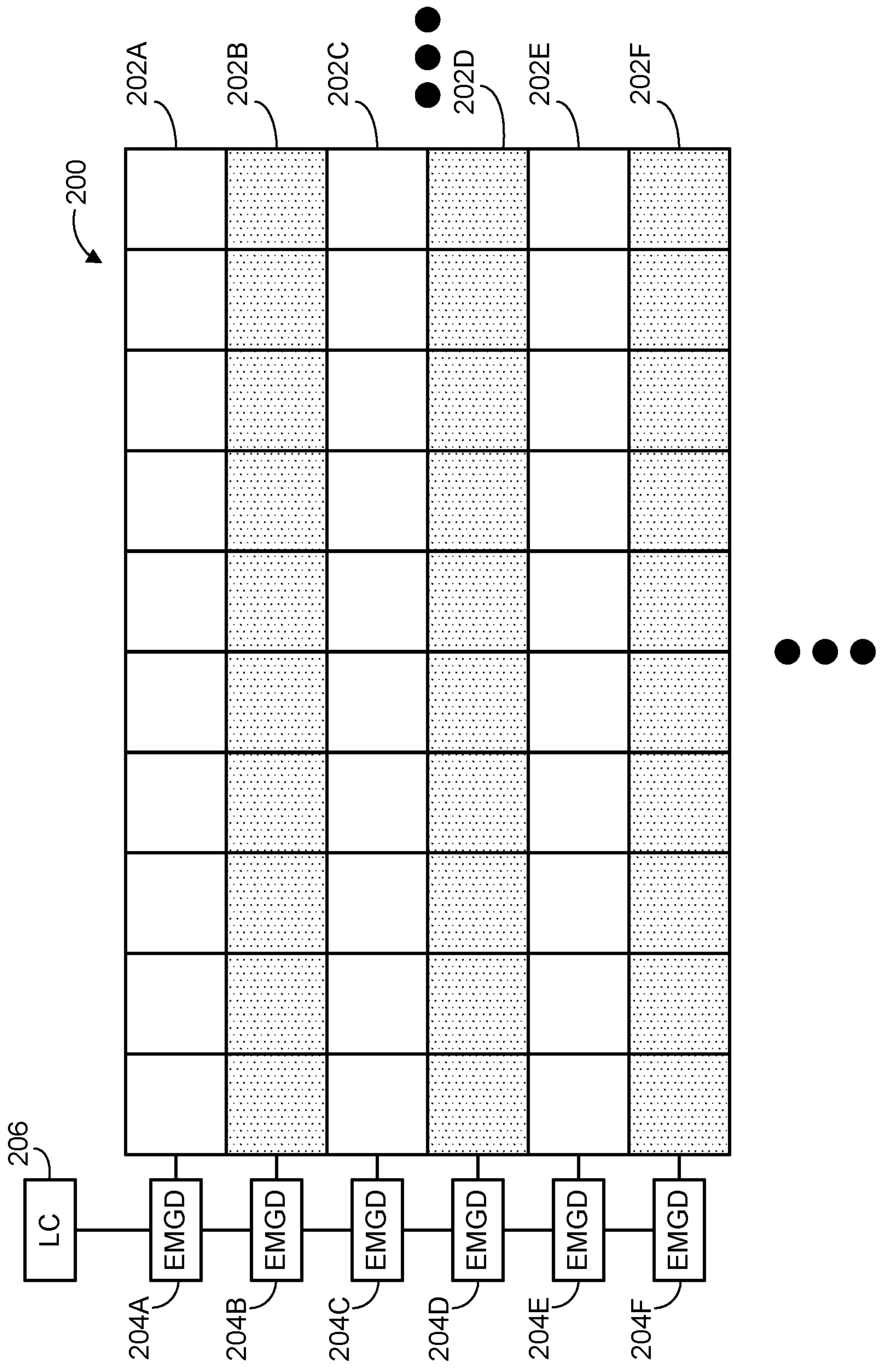
FIG. 2 schematically shows an example plurality of pixels of the digital display system of FIG. 1.

FIG. 2 schematically shows a plurality of pixels 200. Pixels 200 may be a subset of the pixels of a digital display, such as digital display system 100 of FIG. 1. In FIG. 2, pixels 200 are arranged as a grid including six rows and ten columns, where the pixel rows are labeled as rows 202A-202F. It will be understood, however, that this is not limiting, and that a digital display may include any number of pixels, arranged as any number of rows and columns.

In FIG. 2, the pixel rows of the digital display are divided into two different groups. A first plurality of pixel rows, each including one or more pixels, include rows 202A, 202C, and 202E. A second plurality of pixel rows 202B, 202D, and 202F, also each including one or more pixels, are interleaved with the first plurality of pixel rows. In FIG. 2, the second plurality of pixel rows are represented with a dot fill pattern to visually distinguish them from the first plurality of rows. It will be understood, however, that the distinction between the first plurality of pixel rows and the second plurality of pixel rows is arbitrary, and that in other examples, the rows of the digital display may be divided in different ways.

Notably, the present disclosure primarily focuses on controlling rows of pixels. In other examples, however, pixels may be controlled as columns rather than rows, or the luminance of each pixel of the digital display may be individually controllable.

In FIG. 2, each row of pixels is controlled by a respective electromagnetic (EM) gate driver 204, including drivers 204A-204F. In other words, the digital display includes, for each pixel row of the first and second plurality of pixel rows, an EM gate driver configured to supply the pixel row with a luminance-controlling signal during each of a plurality of image frames. Thus, during each image frame, EM gate driver 204A controls the luminance of each of the pixels of pixel row 202A.

Notably, pixel luminance refers to the amount of light emitted or transmitted by each pixel during any given image frame, and may be set independently of the pixel's color value. In other words, by setting the luminance for individual pixels (or rows of pixels), the amount of light emitted by the digital display may be controlled—e.g., to increase or decrease the apparent brightness of the display, regardless of the current image content. Pixel luminance may be set with any suitable granularity.

The EM gate drivers and luminance-controlling signal may each take any suitable form. In some examples, the EM gate drivers may take the form of power amplifiers that accept a low-level input from a luminance controller 206, and amplify the current for driving the pixels of each row. The "luminance-controlling signal" refers to the electrical signal output by the EM gate drivers and received by the pixels of each row. In some cases, the luminance-controlling signal may be a pulse-width modulated signal that causes each pixel to cycle on and off multiple times during each image frame, as will be discussed in more detail below.

Luminance controller 206 may take the form of any suitable computer logic configured to control the luminance of the pixels of the display device. As shown, the luminance controller is communicatively coupled with each of the plurality of EM gate drivers. Thus, the luminance controller may instruct each of the EM gate drivers to supply the various pixel rows with different luminance-controlling signals to globally affect the luminous intensity of the entire digital display. For example, the luminous intensity of the display may be decreased in response to low ambient light levels, to conserve device power, and/or for any other suitable reason.

As discussed above, the overall luminance of the display may be changed by changing parameters of pulse-width modulated signals supplied to the pixel rows. For example, the duty cycle may be decreased to reduce the amount of light emitted or transmitted by each pixel over a particular interval of time, thereby reducing the total amount of light emitted by the display over that interval of time.

Figure 3A:
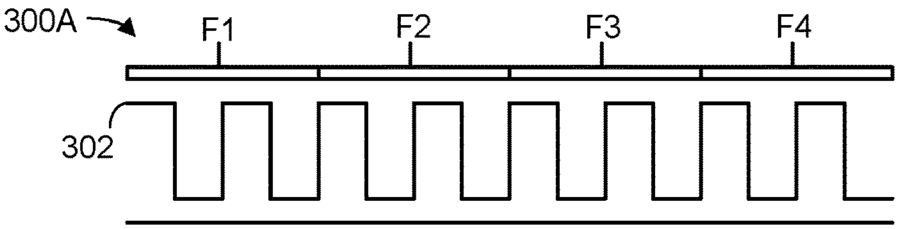
FIGS. 3A and 3B illustrate relationships between a pulse-width modulated signal supplied to pixel rows, and different display refresh rates of a digital display.
Figure 3B:
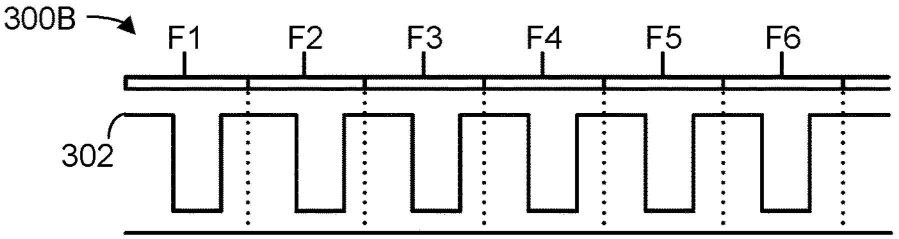

FIGS. 3A and 3B schematically illustrate example pulse-width modulated signals. Specifically, FIG. 3A includes a plot 300A, depicting a pulse-width modulated signal 302 during a sequence of image frames F1-F4. In this example, a frequency of the pulse-width modulated signal is an integer multiple of the display refresh rate. In other words, four pulses of the pulse-width modulated signal occur during each image frame—two on pulses and two off pulses—meaning the pulse-width modulated signal is a 4× multiple of the display refresh rate. As one example, the display refresh rate may be 60 Hz, while the frequency of the pulse-width modulated signal may be 240 Hz. It will be understood, however, that any suitable rates may be used.

By contrast, FIG. 3B shows a different plot 300B depicting the same pulse-width modulated signal 302. In FIG. 3B, the display refresh rate has increased, so the individual image frames have a shorter duration. This is done without changing the frequency of the pulse-width modulated signal—in other words, at the start of each image frame, the pulse-width modulated signal still begins with an on pulse, followed by an off pulse, each lasting the same amount of time as the pulses shown in plot 300A. However, because the display refresh rate has changed, the frequency of the pulse-width modulated signal is now a non-integer multiple of the display refresh rate. Thus, in each image frame, there is not enough time after the off pulse for an entire subsequent on pulse before the frame ends. Instead, each image frame ends on a partial on pulse, and the pulse-width modulated signal resets at the start of the next image frame. This has the effect of causing each pixel to spend more time being on during each frame than being off, due to the relationship between the new display refresh rate and the unchanged frequency of the pulse-width modulated signal, and the fact that the pulse-width modulated signal resets with a new on pulse at the start of each frame. In other examples, however, the pulse-width modulated signal need not rest every image frame, but rather may continue independently of the image frame timing.

In the example of FIG. 3B, during each image frame, more overall light is emitted as compared to plot 300A, because each pixel spends more time being on than being off. This can contribute to the undesirable flickering effect described above. In other words, when the display refresh rate increases from the rate shown in plot 300A to the rate shown in plot 300B, any viewers of the digital display may perceive an increase in apparent brightness. For other display refresh rates, the opposite effect may occur—i.e., pixels may spend more time off during each frame than on, causing a decrease in apparent brightness. Thus, when the display refresh rate is repeatedly varied over time—e.g., to match the output of a video game application—viewers of the digital display may perceive repeated increases and decreases in apparent brightness contributing to an unsatisfactory viewing experience.

Figure 4:
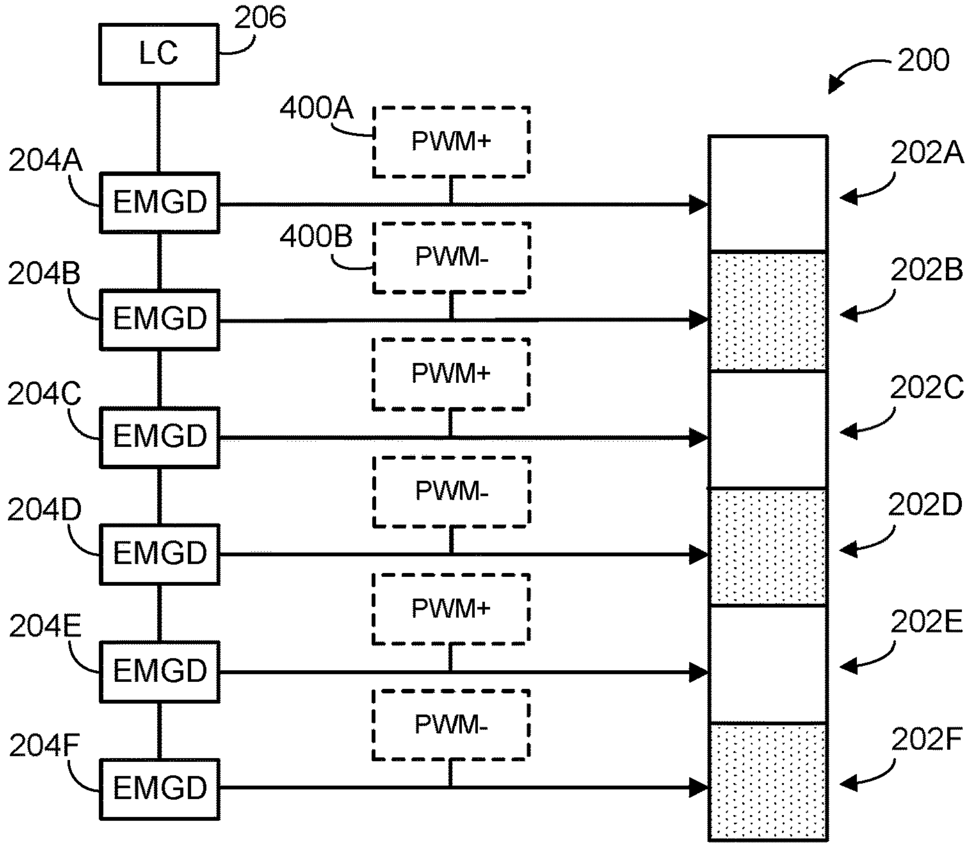
FIG. 4 schematically illustrates supplying first and second pluralities of pixel rows with pulse-width modulated signals.

Accordingly, the luminance controller may in some cases cause different pixel rows to be supplied with pulse-width modulated signals having opposite phases, on the same or different image frames. FIG. 4 shows one example implementation, in which spatial averaging is used. Specifically, FIG. 4 again shows pixels 200, this time only including the first pixel of each row 202A-202F. As shown, luminance controller 206 instructs the EM gate drivers for the first plurality of pixel rows, including rows 202A, 202C, and 202E, to supply the pixel rows with a pulse-width modulated signal 400A. As discussed above, the pulse-width modulated signal may modulate between a high voltage and a low voltage, and in some instances such modulation may occur more than once each image frame. For simplicity of illustration, FIG. 4, as well as other Figures in this disclosure, indicates that the pulse-width modulated signal for a particular frame starts with an on pulse (i.e., high voltage) using the label "PWM+". As shown in FIG. 4, luminance controller 206 instructs the EM gate drivers for the second plurality of rows, including rows 202B, 202D, and 202F, to supply the pixel rows with the pulse-width modulated signal 400B starting with an off pulse. FIG. 4, as well as other Figures in this disclosure, indicates that the pulse-width modulated signal for a particular frame starts with an off pulse (i.e., low voltage) using the label "PWM−".

While only six rows are depicted in FIG. 4, it will be understood that substantially all of the pixel rows of the digital display may be divided into interleaved first and second pluralities, and supplied respectively with PWM+ and PWM−. Put another way, the first plurality of pixel rows may include all pixel rows satisfying $(2\times r)+1$, where r is an integer that begins at zero and increments with every two rows. By contrast, the second plurality of pixel rows may include all pixel rows satisfying $(2\times r)$. Thus, the first plurality of pixel rows may include the first row ($r=0$), third row ($r=1$), fifth row ($r=2$), etc. Similarly, the second plurality of pixel rows may include the second row ($r=1$), fourth row ($r=2$), sixth row ($r=3$), etc. Put another way, the first plurality of rows may include all odd-numbered rows, while the second plurality of rows may include all even-numbered rows.

In other embodiments, the pixel rows may be divided differently. For example, interleaving groups of two, three, or more adjacent rows. Furthermore, irregular interleaving patterns may in some cases be used. In other words, the second plurality of rows may be interleaved with the first plurality of rows using any pattern. For example, the first pixel row may be supplied with PWM+, and the second pixel row supplied with PWM−, then the third and fourth pixel rows may each be supplied with PWM+, while the fifth and sixth rows are each supplied with PWM−, etc. In general, any suitable interleaving pattern may be used provided that it enables display of imagery that appears to have a substantially homogenous luminance to human viewers.

Figure 5:
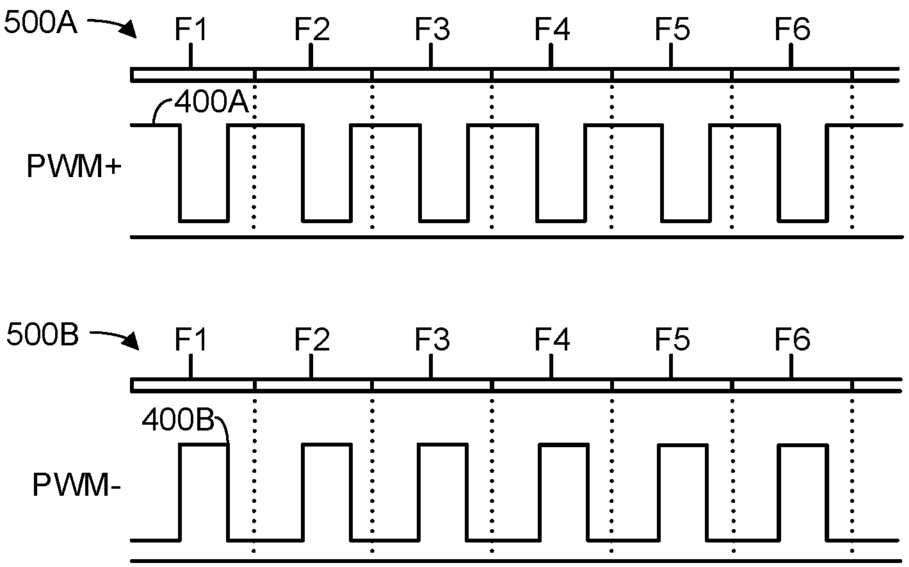
FIG. 5 schematically depicts the pulse-width modulated signals supplied to the pixel rows of FIG. 4.

FIG. 5 schematically depicts example representations of the pulse-width modulated signals supplied to the pixel rows of FIG. 4. Specifically, FIG. 5 includes a plot 500A depicting PWM+ 400A, and a plot 500B depicting PWM− 400B, as compared to the durations of a series of image frames F1-F6. As shown, PWM+ begins with an on pulse, while PWM− begins with an off pulse, meaning the two signals are opposite in phase.

In this example, the frequency of the pulse-width modulated signals are again a non-integer multiple of the display refresh rate. Thus, just as with plot 300B of FIG. 3B, PWM+ causes each pixel to spend more time on during each image frame than off. However, because PWM+ and PWM− have opposite phase, PWM− causes each pixel to spend more time off during each image frame than on. It will be understood that the specific display refresh rate and pulse-width modulated signal frequencies depicted in FIG. 5 are non-limiting examples, and that any suitable rates and signal frequencies may be used.

Use of pulse-width modulated signals having opposite phase, such as those depicted in FIG. 5, can help to mitigate undesirable flickering associated with variable display refresh rates, as discussed above. Returning briefly to FIG. 4, the first plurality of pixel rows are supplied with PWM+, while the second plurality of pixel rows are supplied with PWM−. As such, when the frequency of the pulse-width modulated signal is a non-integer multiple of the current display refresh rate, half of the pixel rows (e.g., corresponding to the first plurality) may emit more overall light per image frame. However, because the other half of the pixel rows (e.g., the second plurality) are supplied with a pulse-width modulated signal having an opposite phase, those rows emit relatively less light per image frame. Because the individual pixel rows are typically too small for the human eye to distinguish at normal viewing distances, any flickering caused by the changing refresh rates will be reduced, if not completely imperceptible, when the PWM+ rows are interleaved with the PWM− rows.

Figure 6:
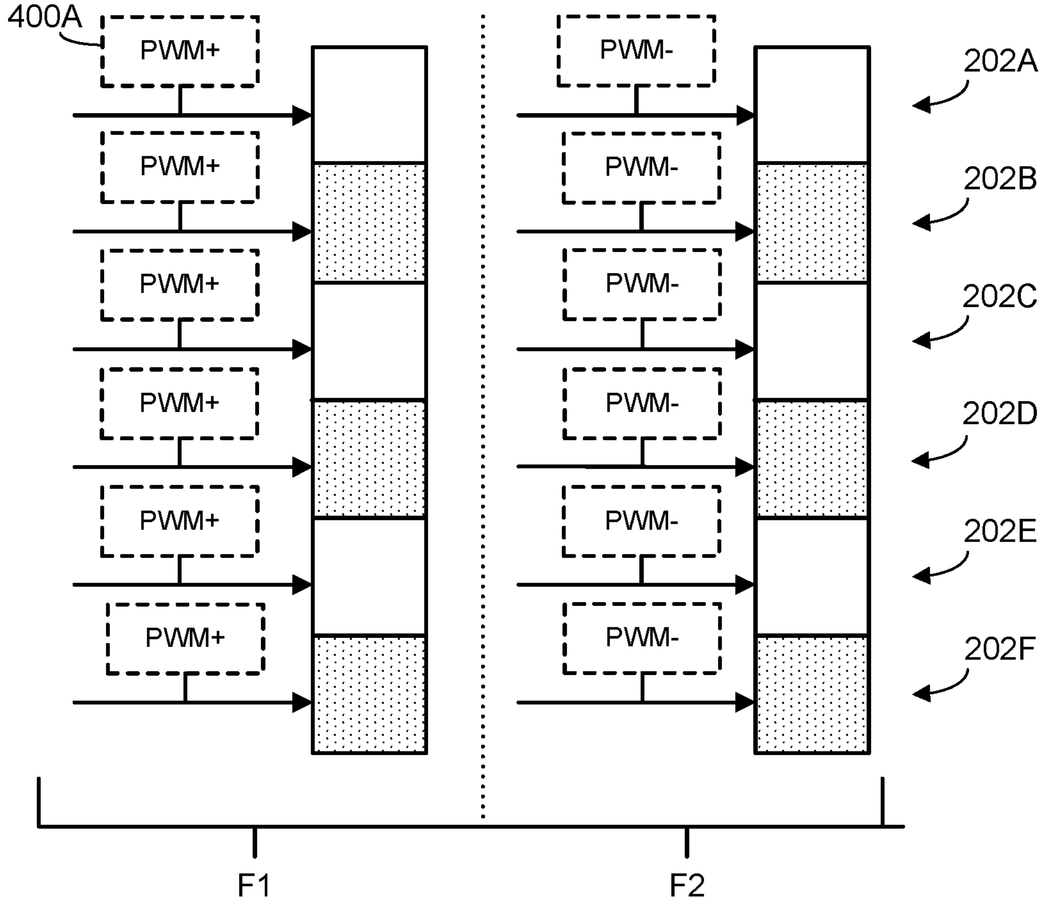
FIG. 6 schematically illustrates supplying pixel rows with pulse-width modulated signals during first and second image frames.
Figure 7:
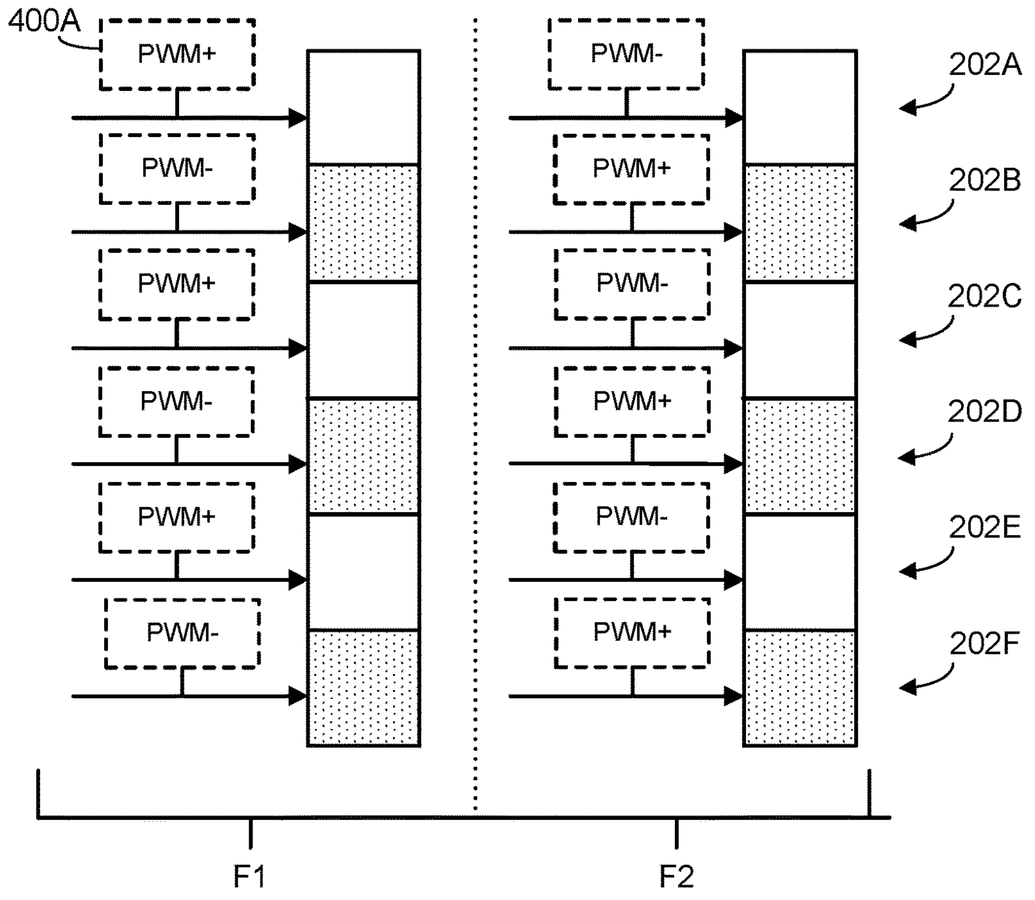
FIG. 7 schematically illustrates supplying first and second pluralities of pixel rows with pulse-width modulated signals during first and second image frames.

In some examples, temporal averaging may be used in addition to, or as an alternative to, spatial averaging. One such example is schematically depicted in FIG. 6, which again schematically depicts different pulse-width modulated signals being supplied to the first pixels of pixel rows 202A-202F. Though the luminance controller and EM gate drivers are omitted from FIGS. 6 and 7, it will be understood that each row of pixels is communicatively coupled with a respective EM gate driver, which is instructed by the luminance controller to supply its pixel row with a pulse-width modulated signal. In this example, all of the pixel rows are supplied with PWM+ on a first image frame F1. During a second image frame F2, all pixel rows are supplied with PWM−. This pattern may repeat for subsequent image frames—i.e., during image frame F3, the pixel rows may again be supplied with PWM+, and during frame F4, the pixel rows may again be supplied with PWM−. In other words, the image frames may be divided into a first plurality of image frames, and a second plurality of image frames interleaved with the first plurality of image frames. Any or all of the pixel rows of the digital display may be supplied with pulse-width modulated signals starting with a different polarity depending on whether the current image frame is of the first plurality or the second plurality.

In one example, the luminance controller instructs the EM gate drivers for the plurality of pixel rows to supply a pulse-width modulated signal starting with an on pulse for all image frames satisfying (2×t)+1, where t is an integer that begins at zero and increments with every two image frames. By contrast, the luminance controller may instruct the EM gate drivers for the plurality of pixel rows to supply the pulse-width modulated signal starting with an off pulse for all image frames satisfying (2×t). Thus, the pixel rows may be supplied with PWM+ on the first image frame (t=0), third image frame (t=1), fifth image frame (t=2), etc. Similarly, the pixel rows may be supplied with PWM− on the second image frame (t=1), fourth image frame (t=2), sixth image frame (t=3), etc. For example, the pixel rows may be supplied with PWM+ on odd-numbered frames, and supplied with PWM− on even-numbered frames, or vice versa.

In other embodiments, however, the frames may be divided differently. For example, interleaving groups of two, three, or more consecutive frames. Alternatively, irregular frame interleaving patterns may be used. In other words, the second plurality of image frames may be interleaved with the first plurality of image frames using any pattern. For example, all rows may be supplied with PWM+ on a first frame, then all rows may be supplied with PWM− on the second frame, while on the third and fourth frames all rows are supplied with PWM+, and all rows supplied with PWM− on the fifth and sixth frames, etc. As with spatial averaging, any suitable interleaving pattern may be used provided that it enables display of imagery that appears to have a substantially homogenous luminance to human viewers.

As discussed above, some display refresh rates may cause an apparent increase in brightness when more pixel on pulses occur during each image frame than pixel off pulses, resulting in a net increase in emitted light during each image frame. However, when temporal averaging is used as described above, every other image frame will actually emit relatively less light, as every pixel row is supplied with PWM−, causing more pixel off pulses per image frame than on pulses. When the refresh rate is sufficiently high that human viewers cannot distinguish the difference between relatively higher-luminance and lower-luminance image frames, the apparent brightness of the displayed image may not change. In other words, via temporal averaging, the viewer may perceive the displayed image to be substantially homogeneous in luminance because the human visual system cannot individually distinguish image frames above a threshold refresh rate.

In some examples, both spatial and temporal averaging may be used together to further mitigate flickering caused by refresh rate changes. This is schematically illustrated in FIG. 7, again schematically depicting different pulse-width modulated signals being supplied to the first pixels of pixel rows 202A-202F during two different image frames F1 and F2. As with FIG. 4, the first and second pluralities of pixel rows are respectively supplied with PWM+ and PWM− during the first image frame F1. During the second image frame F2, the first plurality of pixel rows are supplied with PWM−, and the second plurality of pixel rows are supplied with PWM+. Thus, during each image frame, half of the pixel rows are supplied with pulse-width modulated signals having an opposite phase from the other half of the pixel rows, providing spatial averaging. Furthermore, for every new image frame, every pixel row is supplied with a pulse-width modulated signal having an opposite phase from the previous image frame, providing temporal averaging. In other words, both the pixel rows and the image frames may be divided into interleaved first and second pluralities.

In one example, the luminance controller may, during image frames (2×t)+1, instruct the EM gate drivers for the first plurality of pixel rows, including pixel rows (2×r)+1, to supply a pulse-width modulated signal starting with an on pulse, and instruct the EM gate drivers for the second plurality of pixel rows, including pixel rows (2×r) to supply the pulse-width modulated signal starting with an off pulse. During image frames (2×t), the luminance controller instructs the EM gate drivers for the first plurality of pixel rows, including pixel rows (2×r)+1, to supply the pulse-width modulated signal starting with an off pulse, and instruct the EM gate drivers for the second plurality of pixel rows, including pixel rows (2×r), to supply the pulse-width modulated signal starting with an on pulse. However, as discussed above, any suitable interleaving patterns may be used for either or both of spatial averaging and temporal averaging. For example, the second plurality of rows may be interleaved with the first plurality of rows using any pattern. Additionally, or alternatively, the second plurality of image frames may be interleaved with the first plurality of image frames using any pattern.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
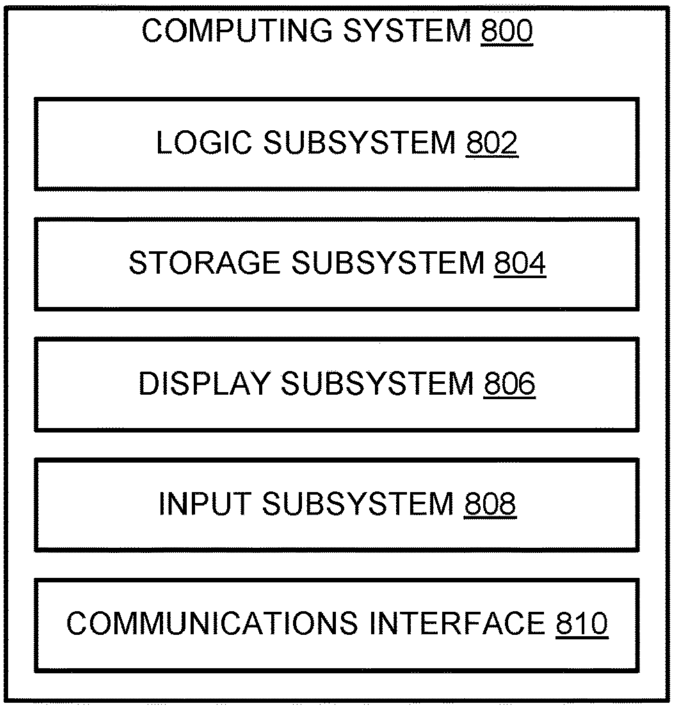
FIG. 8 schematically shows an example computing system.

FIG. 8 schematically shows a simplified representation of a computing system 800 configured to provide any to all of the compute functionality described herein. In particular, digital display system 100 of FIG. 1 may be implemented as computing system 800. Computing system 800 may take the form of one or more personal computers, network-accessible server computers, digital display systems, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. Any or all of the display controller 108, image source 106, and luminance controller 206 described above may be implemented as logic subsystem 206. The logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a digital display comprises: a first plurality of pixel rows each including one or more pixels; a second plurality of pixel rows each including one or more pixels, the second plurality of pixel rows interleaved with the first plurality of pixel rows; for each pixel row of the first and second plurality of pixel rows, an electromagnetic, EM, gate driver configured to supply the pixel row with a luminance-controlling signal during each of a plurality of image frames; and a luminance controller configured to instruct the EM gate drivers for the first plurality of pixel rows to supply a pulse-width modulated signal starting with an on pulse, and instruct the EM gate drivers for the second plurality of pixel rows to supply the pulse-width modulated signal starting with an off pulse. In this example or any other example, the digital display further comprises a display controller configured to update display of visual content by the digital display at a display refresh rate. In this example or any other example, a frequency of the pulse-width modulated signal is an integer multiple of the display refresh rate. In this example or any other example, the display controller is further configured to dynamically change the display refresh rate. In this example or any other example, for at least some of the plurality of image frames, a frequency of the pulse-width modulated signal is a non-integer multiple of the display refresh rate. In this example or any other example, the digital display is an organic light-emitting diode, OLED, display, or a quantum dot light-emitting diode, QLED, display. In this example or any other example, the digital display is a micro light-emitting diode, micro-LED, display.

In an example, a digital display comprises: a plurality of pixel rows each including one or more pixels; for each of the plurality of pixel rows, an EM gate driver configured to supply the pixel row with a luminance-controlling signal during each of a first plurality of image frames and a second plurality of image frames interleaved with the first plurality of image frames; and a luminance controller configured to, for the first plurality of image frames, instruct the EM gate drivers for the plurality of pixel rows to supply a pulse-width modulated signal starting with an on pulse, and for the second plurality of image frames, instruct the EM gate drivers for the plurality of pixel rows to supply the pulse-width modulated signal starting with an off pulse. In this example or any other example, the digital display further comprises a display controller configured to update display of visual content by the digital display at a display refresh rate. In this example or any other example, a frequency of the pulse-width modulated signal is an integer multiple of the display refresh rate. In this example or any other example, the display controller is further configured to dynamically change the display refresh rate. In this example or any other example, for at least some of the first plurality of image frames or the second plurality of image frames, a frequency of the pulse-width modulated signal is a non-integer multiple of the display refresh rate. In this example or any other example, the digital display is an organic light-emitting diode, OLED, display, or a quantum dot light-emitting diode (QLED) display. In this example or any other example, the digital display is a micro light-emitting diode, micro-LED, display.

In an example, a digital display comprises: a first plurality of pixel rows each including one or more pixels; a second plurality of pixel rows each including one or more pixels, the second plurality of pixel rows interleaved with the first plurality of pixel rows; for each pixel row of the first and second plurality of pixel rows, an EM gate driver configured to supply the pixel row with a luminance-controlling signal during each of a first plurality of image frames and a second plurality of image frames interleaved with the first plurality of image frames; and a luminance controller configured to, during the first plurality of image frames, instruct the EM gate drivers for the first plurality of pixel rows to supply a pulse-width modulated signal starting with an on pulse, and instruct the EM gate drivers for the second plurality of pixel rows to supply the pulse-width modulated signal starting with an off pulse; and the luminance controller configured to, during the second plurality of image frames, instruct the EM gate drivers for the first plurality of pixel rows to supply the pulse-width modulated signal starting with an off pulse, and instruct the EM gate drivers for the second plurality of pixel rows to supply the pulse-width modulated signal starting with an on pulse. In this example or any other example, the digital display further comprises a display controller configured to update display of visual content by the digital display at a display refresh rate. In this example or any other example, a frequency of the pulse-width modulated signal is an integer multiple of the display refresh rate. In this example or any other example, the display controller is further configured to dynamically change the display refresh rate. In this example or any other example, for at least some of the first plurality of image frames or the second plurality of image frames, a frequency of the pulse-width modulated signal is a non-integer multiple of the display refresh rate. In this example or any other example, the digital display is an organic light-emitting diode, OLED, display, or a quantum dot light-emitting diode, QLED, display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A digital display, comprising:

a plurality of pixel rows each including one or more pixels;

for each of the plurality of pixel rows, an electromagnetic (EM) gate driver configured to supply the pixel row with a luminance-controlling signal during each of a first plurality of image frames and a second plurality of image frames interleaved with the first plurality of image frames; and a luminance controller configured to, for the first plurality of image frames, instruct the EM gate drivers for the plurality of pixel rows to supply a pulse-width modulated signal starting with an on pulse, and for the second plurality of image frames, instruct the EM gate drivers for the plurality of pixel rows to supply the pulse-width modulated signal starting with an off pulse.

2. The digital display of claim 1, further comprising a display controller configured to update display of visual content by the digital display at a display refresh rate.

3. The digital display of claim 2, wherein a frequency of the pulse-width modulated signal is an integer multiple of the display refresh rate.

4. The digital display of claim 1, wherein the display controller is further configured to dynamically change the display refresh rate.

5. The digital display of claim 4, wherein for at least some of the first plurality of image frames or the second plurality of image frames, a frequency of the pulse-width modulated signal is a non-integer multiple of the display refresh rate.

6. The digital display of claim 1, wherein the digital display is an organic light-emitting diode, OLED, display, or a quantum dot light-emitting diode (QLED) display.

7. The digital display of claim 1, wherein the digital display is a micro light-emitting diode, micro-LED, display.

8. A digital display, comprising:

a first plurality of pixel rows each including one or more pixels;

a second plurality of pixel rows each including one or more pixels, the second plurality of pixel rows interleaved with the first plurality of pixel rows;

for each pixel row of the first and second plurality of pixel rows, an electromagnetic (EM) gate driver configured to supply the pixel row with a luminance-controlling signal during each of a first plurality of image frames and a second plurality of image frames interleaved with the first plurality of image frames; and a luminance controller configured to, during the first plurality of image frames, instruct the EM gate drivers for the first plurality of pixel rows to supply a pulse-width modulated signal starting with an on pulse, and instruct the EM gate drivers for the second plurality of pixel rows to supply the pulse-width modulated signal starting with an off pulse; and the luminance controller configured to, during the second plurality of image frames, instruct the EM gate drivers for the first plurality of pixel rows to supply the pulse-width modulated signal starting with an off pulse, and instruct the EM gate drivers for the second plurality of pixel rows to supply the pulse-width modulated signal starting with an on pulse.

9. The digital display of claim 8, further comprising a display controller configured to update display of visual content by the digital display at a display refresh rate.

10. The digital display of claim 9, wherein a frequency of the pulse-width modulated signal is an integer multiple of the display refresh rate.

11. The digital display of claim 8, wherein the display controller is further configured to dynamically change the display refresh rate.

12. The digital display of claim 11, wherein for at least some of the first plurality of image frames or the second plurality of image frames, a frequency of the pulse-width modulated signal is a non-integer multiple of the display refresh rate.

13. The digital display of any of claim 8, wherein the digital display is an organic light-emitting diode, OLED, display, or a quantum dot light-emitting diode, QLED, display.

14. The digital display of claim 8, wherein the digital display is a micro light-emitting diode, micro-LED, display.

15. A digital display, comprising:

a first plurality of pixel rows each including one or more pixels;

a second plurality of pixel rows each including one or more pixels, the second plurality of pixel rows interleaved with the first plurality of pixel rows;

for each pixel row of the first and second plurality of pixel rows, an electromagnetic (EM), gate driver configured to supply the pixel row with a luminance-controlling signal during each of a plurality of image frames; and a luminance controller configured to instruct the EM gate drivers for the first plurality of pixel rows to supply a pulse-width modulated signal starting with an on pulse, and instruct the EM gate drivers for the second plurality of pixel rows to supply the pulse-width modulated signal starting with an off pulse; further comprising a display controller configured to update display of visual content by the digital display at a display refresh rate, wherein the display controller is further configured to dynamically change the display refresh rate.

16. The digital display of claim 15, wherein a frequency of the pulse-width modulated signal is an integer multiple of the display refresh rate.

17. The digital display of claim 16, wherein for at least some of the plurality of image frames, a frequency of the pulse-width modulated signal is a non-integer multiple of the display refresh rate.

18. The digital display of any of claim 15, wherein the digital display is an organic light-emitting diode, OLED, display, or a quantum dot light-emitting diode, QLED, display.

19. The digital display of claim 14, wherein the digital display is a micro light-emitting diode, micro-LED, display.

20. The digital display of claim 15, wherein the luminance controller is further configured to, for a subsequent image frame of the plurality of image frames, instruct the EM gate drivers for the first plurality of pixel rows to supply the pulse-width modulated signal starting with the on pulse, and instruct the EM gate drivers for the second plurality of pixel rows to supply the pulse-width modulated signal starting with the off pulse.

* * * * *